(12) United States Patent
Oh

(10) Patent No.: US 6,768,930 B2
(45) Date of Patent: Jul. 27, 2004

(54) METHOD AND APPARATUS FOR RESOLVING CONFLICTS IN A SUBSTRATE PROCESSING SYSTEM

(75) Inventor: Hilario Oh, Rochester Hills, MI (US)

(73) Assignee: ASML Holding N.V. (NL)

( * ) Notice: Subject to any disclaimer, the term of this patent is extended or adjusted under 35 U.S.C. 154(b) by 0 days.

(21) Appl. No.: 10/370,138

(22) Filed: Feb. 18, 2003

(65) Prior Publication Data

US 2003/0154001 A1 Aug. 14, 2003

Related U.S. Application Data

(63) Continuation-in-part of application No. 10/172,400, filed on Jun. 14, 2002, which is a continuation of application No. 09/336,353, filed on Jun. 18, 1999, now Pat. No. 6,418,356.
(60) Provisional application No. 60/114,422, filed on Dec. 31, 1998.

(51) Int. Cl.[7] ............................. G06F 19/00; G06F 7/00
(52) U.S. Cl. ....................... 700/217; 700/102; 700/228
(58) Field of Search ................................ 700/217, 228, 700/100, 102, 178

(56) References Cited

U.S. PATENT DOCUMENTS

| | | | |
|---|---|---|---|
| 5,136,222 A | 8/1992 | Yamamoto et al. | 318/568.2 |
| 5,226,118 A | 7/1993 | Baker et al. | 345/440 |
| 5,305,221 A | 4/1994 | Atherton | 364/468 |
| 5,375,061 A | 12/1994 | Hara et al. | 700/121 |
| 5,428,555 A | 6/1995 | Starkey et al. | |
| 5,444,632 A | 8/1995 | Kline et al. | 364/468 |
| 5,591,299 A | 1/1997 | Seaton et al. | 156/626.1 |
| 5,612,886 A | 3/1997 | Weng | 364/468.07 |
| 5,696,689 A | 12/1997 | Okumura et al. | 700/121 |
| 5,754,780 A | 5/1998 | Asakawa et al. | 395/200.38 |
| 5,764,520 A | 6/1998 | Robinson et al. | 700/115 |
| 5,801,945 A | 9/1998 | Comer | 364/468.06 |
| 5,826,236 A | 10/1998 | Narimatsu et al. | 700/100 |
| 5,838,565 A | 11/1998 | Hsieh et al. | 364/468.06 |
| 5,841,659 A | 11/1998 | Tanaka et al. | 700/121 |
| 5,841,660 A | 11/1998 | Robinson et al. | 700/100 |

(List continued on next page.)

FOREIGN PATENT DOCUMENTS

| | | | |
|---|---|---|---|
| EP | 0 800 203 | 10/1997 | 318/568.2 |
| EP | 0837494 | 4/1998 | |
| WO | WO 98/57358 | 12/1998 | |
| WO | WO 99/64940 | 12/1999 | |
| WO | WO 00/41048 | 7/2000 | |

OTHER PUBLICATIONS

Gertz, M. W., et al., "A Human–Machine Interface for Disturbed Virtual Laboratories", *IEEE Robotics & Automation Magazine,* US, IEEE Service Center, Piscataway, NJ vol. 1, No. 4, pp. 5–13, XP000487137 ISSN: 1070–9932.

*Primary Examiner*—Gene O. Crawford
(74) *Attorney, Agent, or Firm*—Blakley, Sokoloff, Taylor & Zafman LLP

(57) ABSTRACT

A wafer track and lithography cluster tool for performing a series of processes with a scheduler which synchronizes all events in a substrate processing system. Events in the cluster tool are scheduled to occur at regular, periodic intervals, thereby improving throughput and quality. The scheduler also eliminates conflicts for transportation resources between modules in the cluster tool. Wafers are loaded into the cluster tool at a regular interval, referred to as a sending period. All events in the system are synchronized with the sending period, and all event timings are normalized in terms of the sending period. The conflicts are resolved by selectively adding delays in modules which can tolerate them without degrading throughput or performance in the system; modules that cannot tolerate delays are exempted. The periodicity of the scheduled cluster tool enables the identification of wafers in the cluster tool. The identification of the order in which a wafer was loaded also identifies a module path followed by the wafer.

8 Claims, 13 Drawing Sheets

U.S. PATENT DOCUMENTS

| | | | |
|---|---|---|---|
| 5,841,677 A | 11/1998 | Yang et al. | 364/569 |
| 5,855,681 A | 1/1999 | Maydan et al. | 118/719 |
| 5,858,863 A | 1/1999 | Yokoyama et al. | 438/514 |
| 5,914,879 A | 6/1999 | Wang et al. | 700/102 |
| 5,928,389 A | 7/1999 | Jevtic | 29/25.01 |
| 5,943,230 A | 8/1999 | Rinnen et al. | 427/255.5 |
| 5,950,170 A | 9/1999 | Pan et al. | 700/121 |
| 5,975,740 A | 11/1999 | Lin et al. | 414/936 |
| 5,980,591 A | 11/1999 | Akimoto et al. | 29/25.01 |
| 6,122,566 A | 9/2000 | Nguyen et al. | 438/908 |
| 6,122,621 A | 9/2000 | Shimada | 700/101 |
| 6,201,999 B1 | 3/2001 | Jevtic | 118/719 |
| 6,298,274 B1 | 10/2001 | Inoue | 700/112 |
| 6,336,204 B1 | 1/2002 | Jevtic | 414/936 |
| 6,360,132 B2 | 3/2002 | Lin et al. | 204/298.25 |
| 6,408,220 B1 | 6/2002 | Nulman | 438/450 |
| 6,418,356 B1 | 7/2002 | Oh | 700/217 |

| MODULE TYPE TYPE | PROCESS TIME | OVERHEAD TIME | PROCESS+ OVERHEAD |
|---|---|---|---|
| VP | 52 | 10 | 62 |
| VPC | 60 | 5 | 65 |
| CT | 46 | 10 | 56 |
| SB | 60 | 7 | 67 |
| SBC | 45 | 5 | 50 |
| PEB | 60 | 5 | 65 |
| PEBC | 45 | 5 | 50 |
| DEV | 100 | 10 | 110 |
| HB | 25 | 10 | 35 |
| HBC | 22 | 10 | 32 |
| EXPOSURE | 10 | 15 | 25 |
| OEBR | 20 | 5 | 25 |
| TARC | 60 | 10 | 70 |
| BARC | 60 | 6 | 66 |
| MORE? | | | |
| | | | |

| TRANSPORT TYPE | TRANSPORT TIME |
|---|---|
| CES | 6 |
| CAPTIVE-1 | 6 |
| CAPTIVE-2 | 6 |
| SI | 6 |
| IBTA | 5 |
| MORE? | |
| | |
| | |
| | |

LOAD-LOCK=CASSETTE

FIG. 8A

SYSTEM THROUGHPUT, (WPH) → 80

SYSTEM TAKT TIME (SEC/WAFER) → 45

| PROCESS STEP | MODULE TYPE TRANSPORT USED USED | PROCESS + OVERHEAD TIME | TRANS- PORT TIME | MODULE TAKT TIME | NUMBER OF MODULES REQUIRED | FUNDA- MENTAL PERIOD |
|---|---|---|---|---|---|---|
| 0 | CASSETTE | 0 | | 0 | | |
| | CES | | 6 | | | |
| 1 | VP | 62 | | 74 | 2 | 20.00 |
| | IBTA | | 5 | | | |
| 2 | VPC | 65 | | 75 | 2 | 38.00 |
| | C-1 | | 6 | | | |
| 3 | CT | 56 | | 68 | 2 | 38.50 |
| | C-1 | | 6 | | | |
| 4 | SB | 67 | | 79 | 2 | 38.50 |
| | IBTA | | 5 | | | |
| 5 | SBC | 50 | | 60 | 2 | 20.00 |
| | C-1 | | 5 | | | |
| 6 | EXPOSURE | 25 | | 35 | 1 | 28.00 |
| | SI | | 6 | | | |
| 7 | PEB | 65 | | 77 | 2 | 34.25 |
| | IBTA | | 5 | | | |
| 8 | PEBC | 50 | | 60 | 2 | 37.50 |
| | C-1 | | 6 | | | |
| 9 | DEV | 110 | | 122 | 3 | 35.00 |
| | C-1 | | 6 | | | |
| 10 | HB | 35 | | 47 | 2 | 35.00 |
| | C-1 | | 6 | | | |
| 11 | HBC | 32 | | 44 | 1 | 37.50 |
| | CES | | 6 | | | |
| 12 | CASSETTE | 0 | | 12 | 1 | 32.50 |
| 13 | VACANT | | | | | |
| 14 | VACANT | | | | | |
| 15 | VACANT | | | | | |
| 16 | VACANT | | | | | |
| 17 | VACANT | | | | | |
| 18 | VACANT | | | | | |

NO. OF MODULES → 22
MINIMUM SENDING RATE → 38.5
ACTUAL SENDING RATE → 45

FIG. 8B

ACTUAL SENDING PERIOD →

| PROCESS STEP | MODULE TYPE / TRANSPORT USED USED | PROCESS + OVERHEAD TIME | TRANS-PORT TIME | TIME MODULE NEED TO BE SERVED | | |
|---|---|---|---|---|---|---|
| | | | | ACTUAL | Ti NORM-ALIZED | Ti NORM-ALIZED |
| 0 | CASSETTE | 0 | | 0 | 0.000 | 0.000 |
| | CES | | 6 | | | |
| 1 | VP | 62 | | 68 | 1.511 | 0.511 |
| | IBTA | | 5 | | | |
| 2 | VPC | 65 | | 138 | 3.067 | 0.067 |
| | C-1 | | 6 | | | |
| 3 | CT | 56 | | 200 | 4.444 | 0.444 |
| | C-1 | | 6 | | | |
| 4 | SB | 67 | | 273 | 6.067 | 0.067 |
| | IBTA | | 5 | | | |
| 5 | SBC | 50 | | 328 | 7.289 | 0.289 |
| | C-1 | | 5 | | | |
| 6 | EXPOSURE | 25 | | 358 | 7.956 | 0.956 |
| | SI | | 6 | | | |
| 7 | PEB | 65 | | 429 | 9.533 | 0.533 |
| | IBTA | | 5 | | | |
| 8 | PEBC | 50 | | 484 | 756 | 0.756 |
| | C-1 | | 6 | | | |
| 9 | DEV | 110 | | 600 | 13.333 | 0.333 |
| | C-1 | | 6 | | | |
| 10 | HB | 35 | | 641 | 14.244 | 0.244 |
| | C-1 | | 6 | | | |
| 11 | HBC | 32 | | 679 | 15.089 | 0.089 |
| | CES | | 6 | | | |
| 12 | CASSETTE | 0 | | 685 | 15.222 | 0.222 |
| | 0 | | 6 | | | |
| 13 | VACANT | 0 | | 685 | 0.000 | 0.000 |
| | 0 | | 0 | | | |
| 14 | VACANT | 0 | | 685 | 0.000 | 0.000 |
| | 0 | | 0 | | | |
| 15 | VACANT | 0 | | 685 | 0.000 | 0.000 |
| | 0 | | 0 | | | |
| 16 | VACANT | 0 | | 685 | 0.000 | 0.000 |
| | 0 | | 0 | | | |
| 17 | VACANT | 0 | | 685 | 0.000 | 0.000 |
| | 0 | | 0 | | | |
| 18 | VACANT | 0 | | 685 | 0.000 | 0.000 |
| | 0 | | 0 | | | |

FIG. 9A

TABLE 1

| PROCESS STEP (1) | MODULE TYPE (2) | T AS-IS (3) | T* TARGET (4) | T*-T GAP (5) | q QUE (6) | ACTUAL QUE (7) |
|---|---|---|---|---|---|---|
| 0 | CASSETTE | 0.000 | 0.000 | 0.000 | 0.000 | 0.000 |
| 1 | VP | 0.511 | 0.511 | 0.000 | 0.000 | 0.000 |
| 2 | VPC | 0.067 | 0.067 | 0.000 | 0.000 | 0.000 |
| 3 | CT | 0.444 | 0.444 | 0.000 | 0.000 | 0.000 |
| 4 | SB | 0.067 | 0.067 | 0.000 | 0.000 | 0.000 |
| 5 | SBC | 0.289 | 0.289 | 0.000 | 0.000 | 0.000 |
| 6 | EXPOSURE | 0.956 | 0.956 | 0.000 | 0.000 | 0.000 |
| 7 | PEB | 0.533 | 0.533 | 0.000 | 0.000 | 0.000 |
| 8 | PEBC | 0.756 | 0.758 | 0.000 | 0.000 | 0.000 |
| 9 | DEV | 0.333 | 0.600 | 0.267 | 0.267 | 12.000 |
| 10 | HB | 0.244 | 0.922 | 0.678 | 0.411 | 18.490 |
| 11 | HBC | 0.089 | 0.089 | 0.000 | 0.322 | 14.510 |
| 12 | CASSETTE | 0.222 | 0.222 | 0.000 | 0.000 | 0.000 |
| 13 | VACANT | 0.000 | 0.000 | 0.000 | 0.000 | 0.000 |
| 14 | VACANT | 0.000 | 0.000 | 0.000 | 0.000 | 0.000 |

FIG. 11A

METHOD AND APPARATUS FOR RESOLVING CONFLICTS IN A SUBSTRATE PROCESSING SYSTEM

This is a continuation-in-part application of U.S. patent application Ser. No. 10/172,400, filed Jun. 14, 2002 which is a continuation application of an application Ser. No. 09/336,353 filed Jun. 18, 1999 issuing as U.S. Pat. No. 6,418,356, which claims the benefit of priority to U.S. Provisional Patent Application No. 60/114,422, entitled "Conflict Resolving Synchronized Scheduler for Substrate Processing Apparatus," filed Dec. 31, 1998, which are all incorporated herein by reference in their entirety.

BACKGROUND OF THE INVENTION

1. Field of the Invention

The invention relates generally to the field of microelectronic fabrication. More particularly, the invention relates to a technique of optimizing the throughput, reliability, and quality of microelectronic fabrication by synchronizing the individual processing and transportation mechanisms within a fabrication system.

2. Discussion of the Related Art

In the process of manufacturing a semiconductor device such as an integrated circuit, numerous steps of microfabrication are performed to form a device. These steps are performed serially on the individual items of manufacture in individual modules; the items of manufacture are transferred between modules by transport mechanisms such as robots. In order to achieve desirable throughput, reliability, and fabrication quality, several conditions must be met:

1) The delivery and removal of the substrate to and from the process modules, as well as the transportation of the wafer between modules, must be accomplished in a timely manner. This timely delivery and removal of substrate is achieved when the flow of substrate is maintained in a periodic and synchronized manner. If periodicity and synchronization are not maintained, the process results will be inconsistent from substrate to substrate, and the expected throughput may be reduced.

2) It is desirable to transport the substrate in similar process flow paths to avoid inconsistency in process results due to variations in the process history of the substrates.

3) It is imperative to ensure that the articles of manufacture do not spend any pre-process or post-process time idling in modules where critical processes are performed. The addition of pre-process or post-process time in these modules degrades not only the throughput but also the process results. For example, in an IC fabrication system, if a substrate is not immediately transferred from the spin coat module to a bake module to thermally cure a photo-resist film layer, the resulting film thickness will be unpredictable. If it is impossible to totally eliminate pre-process and/or post-process times, they should be rendered as brief as possible, and any variations in these times cannot be allowed.

The inability to meet any or all of the above conditions come from the failure to resolve transport conflicts. Conflicts are situations wherein separate modules demand a robot within a time span insufficient for the robot to service these modules One conventional solution to the concerns listed above is the addition of extra process modules and transportation resources. However, the size limitations and geometrical constraints of a track system limit the possibility of resolving the above difficulties by adding additional process modules or transportation resources.

The addition of dedicated transfer arms to transfer substrates between adjacent modules (hereinafter called Inter Bay Transfer Arms, or IBTAs) is another method used to improve throughput and eliminate some of the pre-process and/or post-process times. However, the addition of IBTAs also has serious drawbacks. Dedicated transfer arms complicate the tool and increase its cost, constrain the position of the modules, and cannot be used everywhere in the tool. As a result, the tasks of managing the substrate flow in the track system while maintaining both high throughput and quality and resolving all transport conflicts become unmanageable.

Another conventional solution is to assign a set of substrate transport priority rules. Prior to any robot move, the control system, also referred to as the software scheduler, verifies the status of substrates in different modules and makes transfer priority decisions based on these rules. However, to achieve high throughputs, the scheduler may generate undesirable, unpredictable and variable pre-process and post-process times in critical modules, and the substrates may also be forced to follow different flow paths to complete their process cycle.

A substrate processing system may further include lithographic projection apparatus that can be used in the manufacture of integrated circuits (ICs). In such a case, the patterning means may generate a circuit pattern corresponding to an individual layer of the IC, and this pattern can be imaged onto a target portion (comprising one or more dies) on a substrate that has been coated with a layer of radiation-sensitive material. In general, a single wafer will contain a whole network of adjacent target portions that are successively irradiated via the projection system, one at a time. In some current apparatus, employing patterning by a mask on a mask table, a distinction can be made between two different types of machine. In one type of lithographic projection apparatus, each target portion is irradiated by exposing the entire mask pattern onto the target portion at once using what is commonly referred to as a wafer stepper. In an alternative apparatus, which is commonly referred to as a stop-and-scan apparatus, each target portion is irradiated by progressively scanning the mask pattern under the projection beam in a given reference direction (the "scanning" direction) while synchronously scanning the substrate table parallel or anti-parallel to this direction. Since the projection system will generally have a magnification factor M (generally<1), the speed V at which the substrate table is scanned will be a factor M times that at which the mask table is scanned. More information with regard to lithographic devices as here described can be gleaned, for example, from U.S. Pat. No. 6,046,792 which is incorporated herein by reference in its entirety.

There is a continuing desire in the semiconductor industry to be able to manufacture ICs with ever higher component densities and hence smaller feature size. To image smaller features in a lithographic projection apparatus it is necessary to use projection radiation of shorter wavelength. A number of different type of projection radiation have been proposed, including Extreme Ultraviolet (EUV) in the 10–20 nm range, electron beams, ion beams and other charged particle fluxes. These types of radiation beam share the requirement that the beam path, including the mask, substrate and optical components, be kept in a high vacuum. This is to prevent absorption and/or scattering of the beam and a total pressure of less than about $10^{-6}$ millibar is necessary. Optical elements for EUV radiation can be spoiled by the deposition of carbon layers on their surface which imposes the additional requirement that hydrocarbon partial pressures must be kept below $10^{-8}$ or $10^{-9}$ millibar.

Lithographic apparatus may employ various types of projection radiation, non-limiting examples of which include ultra-violet light ("UV") radiation (e.g., with a wavelength of 365 nm, 248 nm, 193 nm, 157 nm or 126 nm), EUV, X-rays, ion beams or electron beams. Depending on the type of radiation used and the particular design requirements of the apparatus, it may comprise a projection system having refractive, reflective or catadioptric components, and comprise vitreous elements, grazing-incidence mirrors, selective multi-layer coatings, magnetic and/or electrostatic field lenses, etc; for simplicity, such components may be loosely referred to in this text, either singly or collectively, as a "lens."

In a manufacturing process using such a lithographic projection apparatus, a pattern in a mask is imaged onto a substrate or silicon wafer which is at least partially covered by a layer of radiation-sensitive material such as resist. Prior to this imaging step, the substrate may undergo various procedures, such as priming, resist coating and a soft bake. After exposure, the substrate may be subjected to other procedures, such as a post-exposure bake (PEB), development, a hard bake and measurement/inspection of the imaged features. This array of procedures is used as a basis to pattern an individual layer of a device, e.g., IC. Such a patterned layer may then undergo various processes such as etching, ion-implantation (doping), metallization, oxidation, chemo-mechanical polishing, etc., all intended to finish off an individual layer. If several layers are required, then the whole procedure, or a variant thereof, will have to be repeated for each new layer. Eventually, an array of devices will be present on the substrate or wafer. These devices are then separated from one another by a technique such as dicing or sawing, whence the individual devices can be mounted on a carrier, connected to pins, etc. Further information regarding such processes may be obtained, for example, from the book "Microchip Fabrication: A Practical Guide to Semiconductor Processing", Third Edition, by Peter van Zant, McGraw Hill Publishing Co., 1997 ISBN 0-07-067250-4.

Heretofore, the semiconductor processing requirements of conflict resolution, synchronization, quality, and path consistency referred to above have not been fully met. What is needed is a solution that simultaneously addresses all of these requirements.

SUMMARY OF THE INVENTION

A primary goal of the invention is to provide a synchronized substrate-transporting algorithm that resolves any possible flow conflicts and thereby improves the performance and the throughput of a track system.

Another primary goal of the invention is to provide an algorithm that determines the optimal allocation of transportation resources for balancing the load amongst transport mechanisms.

Another primary goal of the invention is to enable flexible synchronization of the fabrication system, ensuring that substrate processing and transportation occur at regular, predictable intervals without diminishing the throughput.

In accordance with these goals, there is a particular need for an algorithm that synchronizes the fabrication system, so that each process or substrate transportation always occurs at precise point in the interval. Thus, it is rendered possible to simultaneously satisfy the above-discussed requirements of conflict resolution, synchronization, optimized throughput, and wafer quality, which, in the case of the prior art, are mutually contradicting and are not simultaneously satisfied.

A first aspect of the invention is implemented in an embodiment that is based on an algebraic transformation. A second aspect of the invention is implemented in an embodiment that is based on a genetic algorithm.

With respect to yet another aspect of the invention, a clustered wafer track and lithography system is provided. The benefits of the invention as described herein extend beyond a wafer track alone and are applicable to a combined wafer track and stepper apparatus. The synchronization and optimization of processing substrates in accordance with the invention efficiently achieves high and reliable throughput that can be measured and observed on a systemwide level.

These, and other, goals and aspects of the invention will be better appreciated and understood when considered in conjunction with the following description and the accompanying drawings. It should be understood, however, that the following description, while indicating preferred embodiments of the invention and numerous specific details thereof, is given by way of illustration and not of limitation. Many changes and modifications may be made within the scope of the invention without departing from the spirit thereof, and the invention includes all such modifications.

BRIEF DESCRIPTION OF THE DRAWINGS

A clear conception of the advantages and features constituting the invention, and of the components and operation of model systems provided with the invention, will become more readily apparent by referring to the exemplary, and therefore non-limiting, embodiments illustrated in the drawings accompanying and forming a part of this specification, wherein like reference characters (if they occur in more than one view) designate the same parts. It should be noted that the features illustrated in the drawings are not necessarily drawn to scale.

FIGS. 8A–B are tables illustrating the recipe of a cluster tool.

FIGS. 9A–B illustrates a graph and corresponding table of module pick-up times which arise in a sending period, wherein the sending period is broken into 6 sub-intervals, as there are six possible robot moves within a single sending period.

FIGS. 11A–B illustrate a graph and accompanying tables and matrices, which illustrate the insertion of queues to eliminate conflicts between modules for access to robots.

DESCRIPTION OF PREFERRED EMBODIMENTS

The invention and the various features and advantageous details thereof are explained more fully with reference to the non-limiting embodiments that are illustrated in the accompanying drawings and detailed in the following description of preferred embodiments. Descriptions of well-known components and processing techniques are omitted so as not to unnecessarily obscure the invention in detail.

Figure 1:
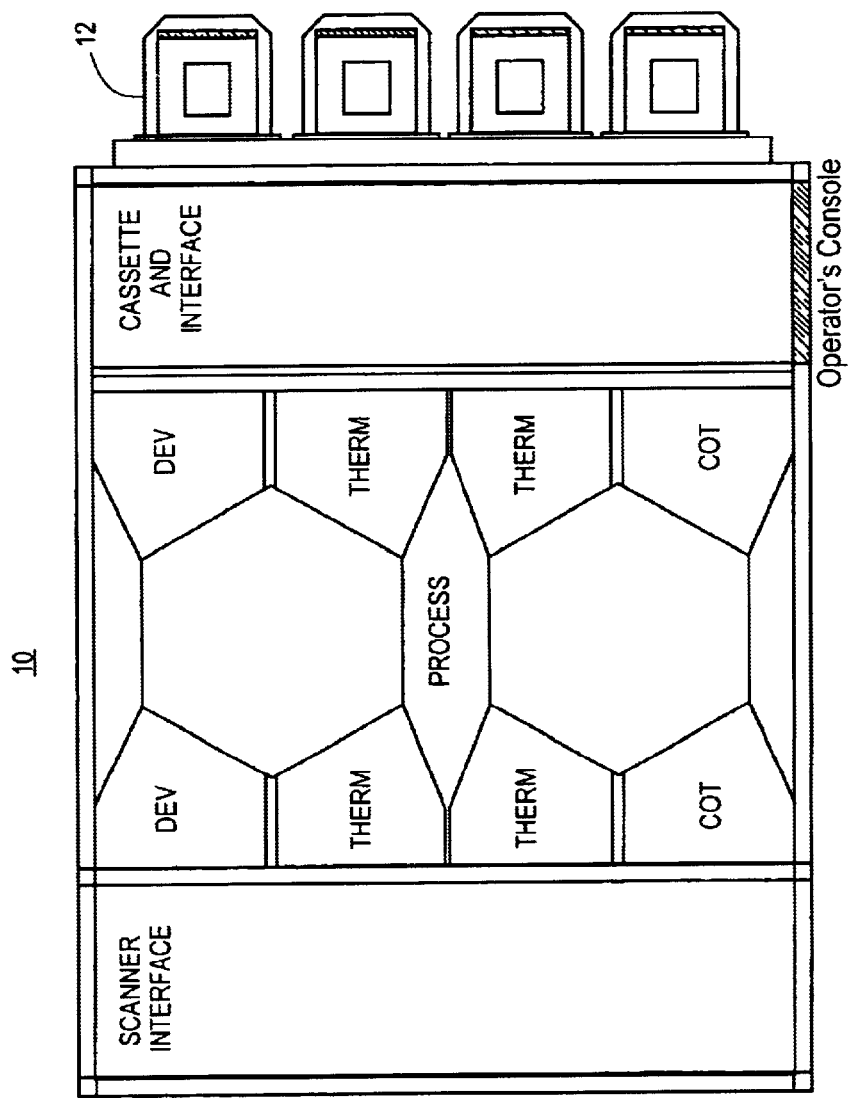
FIG. 1 is an overall illustration of a wafer track system layout.

The invention herein may be applied to semiconductor processing equipment such as the wafer track system generally described in FIG. 1. The wafer track system 10 may include basically three sections: a cassette end interface section, a scanner interface section, and a process section. The cassette end interface section includes apparatus to transfer wafers from cassettes in which they are stored to the track system 10 and, conversely, from the track system back to cassettes following processing. The scanner interface section may be considered another transition area that accommodates equipment for transferring wafers between the track system 10 and photolithographic apparatus. Meanwhile, the process section of a wafer track basically includes stacks of wafer processing modules such as resist coating spin modules, bake/chill modules and resist developing spin modules. As shown in the system layout of FIG. 1, various process stacks within a wafer track may be arranged in an organized manner or optimal configuration to realize certain benefits and wafer handling efficiencies. For example, two or more process stations or "cells" may be configured within the process section as dual-cells or twin-cells having stacks of processing modules selected for resist coat (COT) and develop processes (DEV). Stacks of thermal modules (THERM) may also be included for heating and cooling wafers having heat exchange apparatus such as bake/chill plates. The process stations as shown in FIG. 1 may include a pair of photoresist coat sections (COT) or stacks of processing modules for applying resist coating onto wafers, and a pair of developing sections (DEV) with modules for developing a patterned resist-coated wafer. The wafers may be delivered and transported within the track system 10 between process stations using a series of robotic arms or other wafer handling apparatus according to a desired program or set of instructions in accordance with a predetermined order of processing.

A semiconductor wafer treatment process involves a highly organized set of procedures. Wafers can be initially fed into the wafer track from one or more cassettes stored locally at a cassette end station. As shown in the top view floor plan of FIG. 1, a series of wafer cassettes 12 can be arranged in a set of four distinct columns supported on a cassette-mounted table. A wafer carrying robot may gain access to a desired cassette in order to transfer wafers from and to selected process modules within the wafer track system in response to commands received from a controller (not shown). Before forming a photoresist film layer onto a wafer substrate, the wafer may be first transferred to a priming module where its surface can be thermally and/or chemically treated to remove the presence of moisture and to assure a hydrophobic surface. The wafer may then be cooled with thermal devices such as a chill plate, and then conveyed to a coating unit where a photoresist polymer is distributed evenly onto the wafer surface. The photoresist-coated wafer may be subsequently transferred to a heating unit or bake plate in order to heat and convert the photoresist polymer into a stable film. Upon completion of the heating step, the processed wafer may be cooled and either conveyed to a cassette for storage, or as in many instances, transferred directly to adjoining stepper apparatus through a stepper or scanner interface. The photoresist coating or film on the wafer is then exposed to a circuit pattern by applicable photolithographic techniques within the stepper apparatus. The wafer track system may be integrated with the stepper apparatus to provide a twin-cell semiconductor processing cluster as shown. After exposure of the stable film with the stepper or lithographic apparatus, the wafer can be transferred back to the track system 10 and heated in a bake module to set the circuit pattern onto the film. The wafer may be then cooled in a chill module, and transferred to a develop module. In the develop module, a solution is applied onto the film to develop a portion of the film, and then a rinse solution is applied thereafter onto the wafer in order to remove developer solution from the surface of the wafer. The wafer may be thermally treated in a bake module afterwards, cooled in a chill module, and then returned to a cassette 12 for storage. Variations of these steps and their order of operation may be modified to accomplish desired semiconductor wafer treatment.

Synchronized, Conflict Resolving Schedulers

An aspect of the present invention comprises a method for maximizing throughput and quality in a manufacturing system by scheduling events in the system in a periodic, predictable fashion which eliminates conflicts for system resources. An example of such a manufacturing system comprises a series of process steps 1, . . . , N, which are performed consecutively on individual units of manufacture. The individual process steps of the system are conducted in "modules", or "process chambers", and the series of steps is listed in a "recipe." The manufacturing system also includes resources for transporting the units of manufacture between modules in the series; these resources may include robots.

Conflicts may result between processes in the system when separate modules demand a robot within a time span which insufficient for the robot to service these modules. Additionally, it is desirable to schedule the system in a manner which exhibits periodicity, so that events in the system are synchronized to occur at periodic, predictable intervals. An embodiment of the present invention includes a technique of selectively scheduling delays in various steps of the manufacturing process in order to eliminate all such conflicts, as well enforce periodicity, without degrading throughput or quality of the system.

An Example of Conflict-Resolving Synchronization: Wafer Cluster Tools

An example of the type of manufacturing system described above is a wafer cluster tool. In a wafer cluster tool, the modules comprise process chambers, which are organized around a group of wafer transporting resources, or robots, to perform a sequence of process steps on the wafer. A wafer enters and exits the tool through a buffer called a load port. Once a robot retrieves a wafer from a load port, the wafer is transported sequentially through the series of modules specified in a recipe. The time period defined by a wafer's entrance to a module and the wafer's exit from the module is referred to as a module process time. This process time includes the time actually spent processing the wafer in the module as well as the overhead time required to prepare the wafer for processing and pick up. (note that though the wafer cluster tool is described above as passing an individual wafer between modules, it will be apparent to one skilled in the art that the present invention is equally applicable to a wafer cluster tool in which a discrete set of wafers is passed between modules.)

In certain modules of the cluster tool, a delay in picking-up the processed wafer may adversely affect on-wafer results; such modules are identified as "critical process modules," as they cannot tolerate delays. The module whose process time is longest amongst all modules in the cluster tool is identified as the "gating module"; the process time at this module determines the throughput of the cluster tool. Because the gating module determines the throughput of the cluster tool, it too cannot tolerate delays. The recipe for a wafer cluster tool lists the modules in sequential order, alongside their respective process times. The time required by a robot to transport a wafer between two modules is referred to as its transport time.

Wafer Flow Management in the Cluster Tool

Wafer flow management, i.e., the orchestration of wafer processing and wafer transporting in a cluster tool, determines both the throughput and the on-wafer results delivered by the system. Effective wafer flow management requires the simultaneous satisfaction of the following two conditions: a wafer which was just processed in the sending module and is now ready to move should do so when (1) the receiving module in which the wafer will subsequently be processed is empty; and (2) the robot assigned to transport wafers between those modules is available. In the prior art, condition (1) was satisfied by providing additional redundant modules. Such a solution, however, compromises condition (2) in two ways: (a) it results in an inadequate number of robots serving too many modules or (b) two or more modules may compete simultaneously for the service of a robot.

When the two conditions listed above are compromised, delays in wafer pick-up result. If such delays occur at critical process modules, they adversely affect on-wafer results. And if such delays occur at the gating module, they slow down throughput. As such, it is imperative that the transport conditions listed above are guaranteed with respect to critical process modules and the gating module. In case (a) wherein more handling is required than the robots could provide, adding more robots can mitigate the situation. However, in case (b), the problem resides in the timing of the robot service request. While adding more robots can also alleviate case (b), this is an inadequate solution.

Since the recipe prescribed for the cluster tool determines the timings of the robot service request, a fundamental solution to resolving the two conditions can arise from altering the wafer recipe to synchronize with wafer transport. A scheduling algorithm described herein performs such synchronization.

This scheduler described herein can be encoded in software executed by a computer, wherein the computer comprises a memory for storing the software, and a CPU for executing the software. In an embodiment of the present invention, the scheduler may be used off-line from the manufacturing system to generate a pre-determined schedule for the system. Alternatively, the computer may be coupled to the manufacturing system so that the scheduler can update the operation of the system in real-time.

Synchronizing Wafer Flow in the Cluster Tool

In an embodiment of the present invention, wafer flow is synchronized by sending individual wafers through the cluster tool at a constant rate. This rate, referred to as the tool's "sending rate", is expressed in number of wafers per hour, and paces the wafer flow with a periodicity equal to (3600/sending rate) seconds. This period, referred to as the sending period of the cluster tool, is the heartbeat of the system. Individual wafer units are introduced to the system at intervals of one sending period. And in order to synchronize the cluster tool, all process and transport times are measured in units of sending period. Furthermore, to ensure that the same tasks can be repeated in succeeding periods, the robots in the cluster tool are scheduled to accomplish all service requests, hereafter referred to as "tasks", within a single sending period. As such, the synchronization of the cluster tool requires a determination of 1) the total number of tasks that are performed within a sending period and 2) the exact moment within a sending period that these tasks arise. These moments shall hereafter be referred to as the "timings" of the respective tasks.

Figure 2:
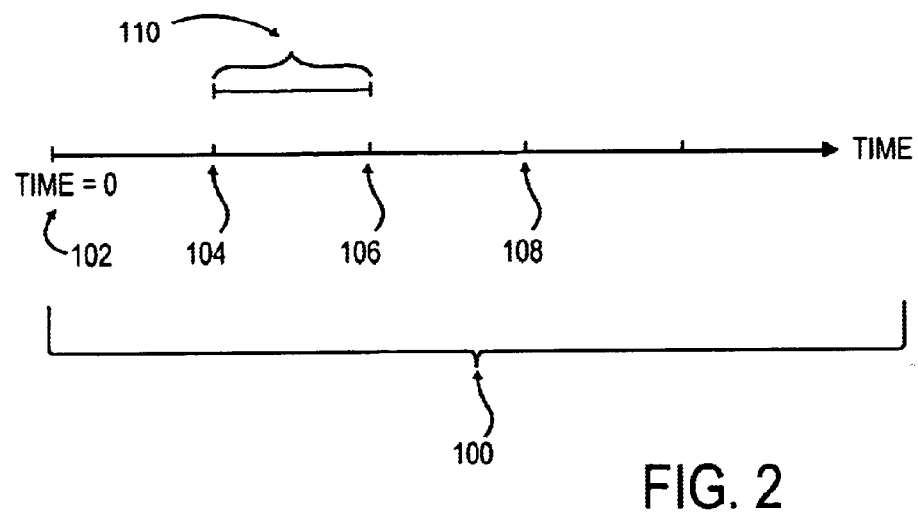
FIG. 2 is a time line illustrating the points at which wafers are loaded into a cluster tool, wherein the points are separated by intervals of one sending period.

The concepts of sending periods and synchronization are illustrated in FIG. 2. The timeline 100 has an origin 102, which denotes the moment when the first wafer is loaded into the cluster tool. The timeline 100 is demarcated in units of one sending period 110. Each demarcation 104 106 108 indicates, respectively, the times at which the second, third, and fourth wafers are loaded into the cluster tool.

Figure 3:
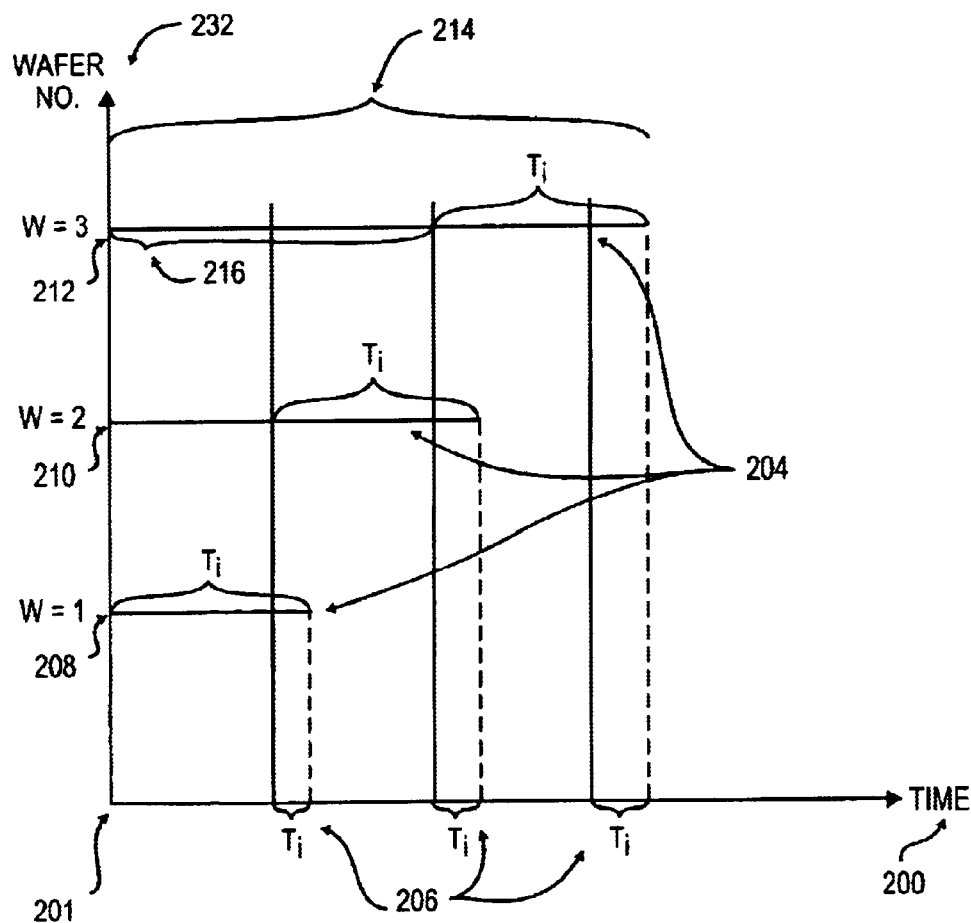
FIG. 3 illustrates the relative and absolute pick-up times of three wafers at a process i, as well as the mantissas of the pick-up times, wherein the pick-up times are normalized in terms of the sending period.

A principal characteristic of synchronization is periodicity: the present invention ensures that for each task i, i=1, . . . , n, the pick-up times for any wafer undergoing that task are identical. Thus each task i in the cluster tool can be associated with a relative pick-up time denoted $T_i$, where $T_i$ is normalized in units of the sending period. FIG. 3 depicts this feature of periodicity. Three wafers, wafer 1 208, wafer 2 210, and wafer 3 212 are depicted on the vertical axis 202. The horizontal line depicts the TIME axis 200. The origin of this axis 201 indicates the time at which wafer 1 is loaded into the cluster tool. The relative pick-up times $T_i$ at task i 200 are identical for each wafer. Because the wafers themselves are introduced at intervals of one sending period, the actual pick-up times are separated by units of one sending period.

FIG. 3 also illustrates a distinction between relative and "actual" or "absolute" pick-up times. The relative pick-up time of a process i is denoted by $T_i$ 204. Since the relative pick-up time is measured from the time a wafer is introduced into the wafer cluster tool, the relative pick-up time is identical for each wafer, wafer 1 208, wafer 2 210, and wafer 3 212. The absolute pick-up time 214 is measured from the moment the first wafer was loaded into the cluster tool 201. Since the wafers are introduced at intervals of one sending period, it follows that for any wafer no. w, the absolute pick-up time of wafer w at module i is $$(w-1)+T_i$$

This period (w−1) 216 is illustrated in the figure as shown.

Another parameter which is critical in synchronization is designated by the symbol $\tau_i$. The fraction $\tau_i = T_i - INT(T_i)$, where $INT(T_i)$ is a function that rounds $T_i$ down to the nearest integer, is the fraction of $T_i$ that has elapsed since the beginning of the current sending period. These parameters 206 are also illustrated in FIG. 3. Since the $T_i$ values are identical for each wafer, and since the wafers are inserted at intervals of one sending period, the values of $\tau_i$ 206 are identical for each wafer. These fractions, $\tau_i$, i=1, 2, 3 . . . N comprise the timings of the tasks the robots must accomplish within a sending period.

The number of tasks N and the timings of these tasks constitute the load of the transport. Since $T_i$ is the accumulation up to the ith module of the process times $p_j$, j=1,2,3 ... i; and the robot transport times $t_j$, j=1,2,3 ... i−1, it follows that for any wafer, the relative pick-up time at module i is:

$$T_i = \sum_{j=1}^{i} p_j + \sum_{j=1}^{i-1} t_j; \quad i = 1, 2, 3 \ldots N$$

It also follows that the timing of the tasks, τ=1,2,3 ... N; is $$\tau_i = T_i - INT(T_i) = \sum_{j=1}^{i} p_j + \sum_{j=1}^{i-1} t_j - INT\left(\sum_{j=1}^{i} p_j + \sum_{j=1}^{i-1} t_j\right); \quad (1)$$

$$i = 1, 2, 3 \ldots N$$

Since transport times $t_i$ are fixed for a given cluster tool, it is apparent from Equation (1) that the timing of robot task $\tau_i$ is dependent solely on the process times $p_i$ as prescribed by the recipe.

Periodicity and Wafer Identification

The property of periodicity also enables the identification of wafers in the cluster tool. As elaborated infra, the synchronized scheduler ensures that 1) the wafers are loaded into the cluster tool in sequential order at intervals of one sending period, and 2) each wafer loaded into the cluster tool undergoes identical events at the same times, as measured relative to the moment they are loaded. A consequence of these two conditions is that wafers enter and depart each module in the cluster tool in the order they were originally loaded, at intervals of one sending period. As such, each wafer in a module can be identified simply by tracking the order in which they entered or exited that module. This feature of the synchronized scheduler is referred to as wafer identification, or wafer "tagging."

Tagging and Module Paths

Figure 7:
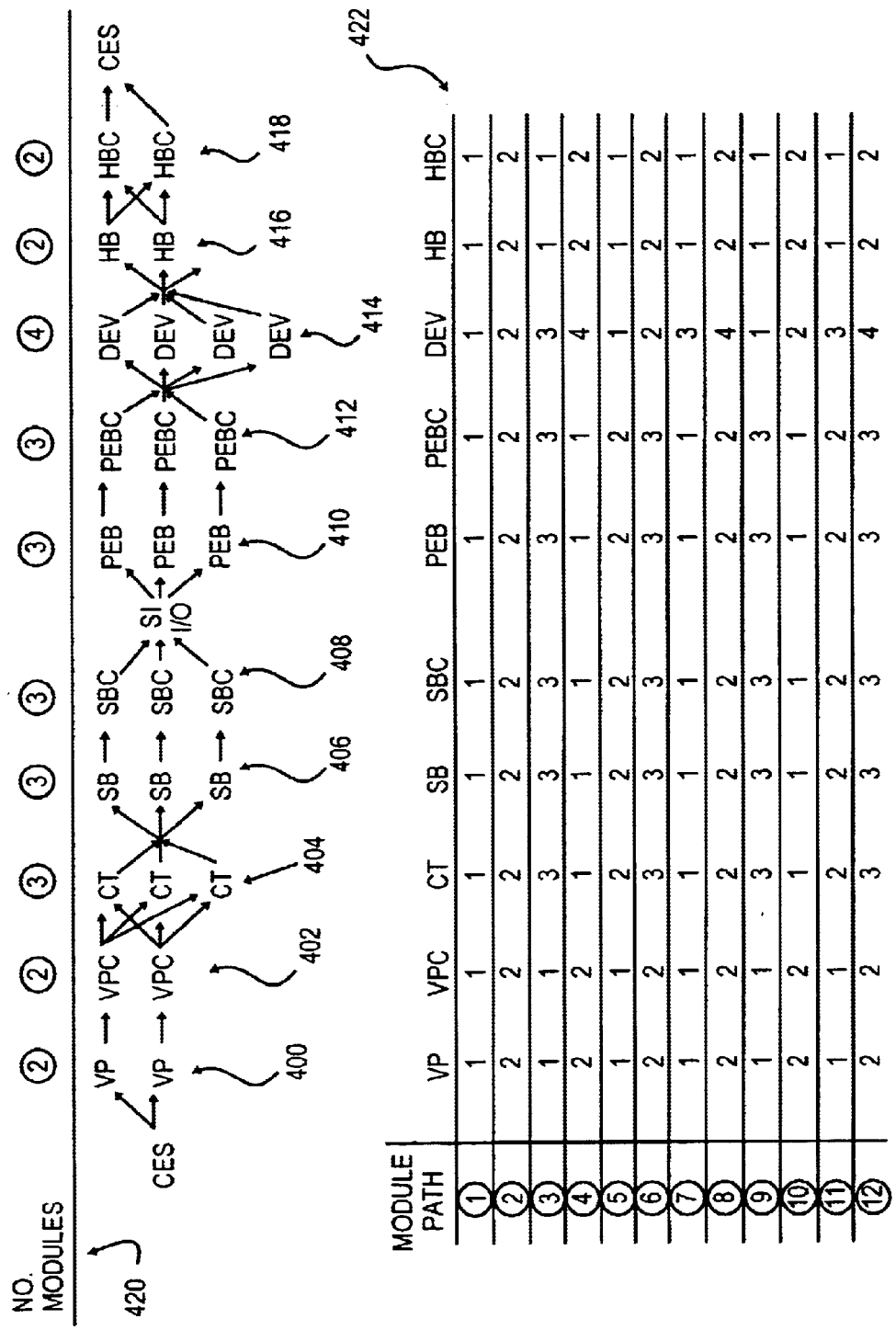
FIG. 7 is a graph and corresponding table illustrating the module paths in the cluster tool.

In an embodiment of the present invention, each wafer loaded into the cluster tool follows a particular "module path", i.e., a particular set of modules which correspond to the processes in the cluster tool. This feature of the present invention is illustrated in FIG. 7. In this embodiment, each process in the cluster tool has one or more modules associated with it, wherein the wafers are processed. The modules for each process are ordered in a sequence such that when wafers arrive at that process, they are placed in the corresponding modules in the sequential order (for e.g., if a process has two corresponding modules, the first wafer in the system goes to the first module, the second wafer goes to the second module, the third wafer enters the first module, the fourth wafer enters the second module, etc.) As a consequence, the total number of module paths that a wafer may follow is constrained to the least common multiple of the number of modules corresponding to each process The embodiment described above is illustrated by example in FIG. 7. FIG. 7 shows a sequence of process steps, VP 400, VPC 402, CT 404, SB 406, SBC 408, PEB 410, PEBC 412, DEV 414, HB 416, HBC 418. A symbol of a process step appears for each module corresponding to the process step. For instance, the process CT 404 has three modules, and correspondingly, the symbol of CT appears three times 404. Above each process step is the number of modules for that process step 420.

In this example, the least common multiple of the number of modules is:

LCM(2,2,3,3,3,3,3,4,2,2)=12

Hence, the recipe for the cluster tool prescribes twelve module paths, which are listed 422. Each column in the table 422 lists the module number for that process step in the respective module path. As there are twelve possible path, every twelfth wafer follows the same module path. As such, by identifying a wafer and the order in which it was loaded into the tool, the present invention enables the determination of the module path followed by the wafer.

Adding Queues to Eliminate Conflicts for Transportation Resources

If a recipe gives rise to simultaneous, competing service requests for particular robots, it would be desirable to resolve the conflicts not by adding more robots, but rather by modifying the recipe itself. One convenient scheme to modify the recipe is to introduce deliberate delays, hereafter called queues $q_i$, to the non-critical process steps in order to achieve timing which resolves conflicts without compromising the throughput or on-wafer results delivered by the tool. Such a scheme, used in conjunction with Equation (1), is the basis for the "synchronous algorithm." To recap, a recipe as originally prescribed may introduce competing service requests which result in delays at critical process and gating steps, thereby degrading the wafer quality and throughput of the single-wafer cluster tool. The aim of "synchronous algorithm" is to insert intentional delays at non-critical process steps in order to ensure that no delays occur at critical process steps or gating steps, and thereby ensure guarantees of throughput and wafer quality.

Solving For The Queues

We shall now demonstrate how to solve for the delays, or $q_i$. Let $\tau_i$ be the timing of robot tasks as dictated by a prescribed recipe per Equation (1). By adding queues $q_j$ to the process time $p_j$ to modify the recipe, the new timing $\tau_i^*$ is given by:

$$\tau_i^* = \sum_{j=1}^{i}(p_j + q_j) + \sum_{j=1}^{i-1} t_j - INT\left(\sum_{j=1}^{i}(p_j + q_j) + \sum_{j=1}^{i-1} t_j\right) \quad (2)$$

$$= \tau_i + \sum_{j=1}^{i} q_j - INT\left(\sum_{j=1}^{i}(p_j + q_j) + \sum_{j=1}^{i-1} t_j\right) + INT\left(\sum_{j=1}^{i} p_j + \sum_{j=1}^{i-1} t_j\right)$$

The objective is to find a set of queues $q_i$ to be inserted at the non-critical process steps such that the time interval between any two modules k and m, k=1, 2, 3, ... N; and m=k, k+1, ... ,N, where module k and module m are assigned to have their wafers picked up by the same robot, is greater than the transport time of the robot. This would allow for time intervals sufficient for the robot to service all modules and thus avoid having to serve more than one module at a given time. However, the queues so derived must also be small enough to avoid excessive idling of modules. And there should be no queues at critical process modules or the gating module.

The set of queues will be solved for using Equation (2). This yields a system of linear equations $$(\tau_i^* - \tau_i) = \sum_{i=1}^{N} a_{ij} q_j;$$

where $a_{ij}$ is a lower triangular matrix with $a_{ij}$=0, for i<j; and $a_{ij}$=1, for i≥j:

$$\begin{bmatrix} \tau_1^* - \tau_1 \\ \tau_2^* - \tau_2 \\ \tau_3^* - \tau_3 \\ \tau_4^* - \tau_4 \\ \vdots \\ \vdots \\ \tau_{N-1^*} - \tau_{N-1} \\ \tau_N^* - \tau_N \end{bmatrix} = \begin{bmatrix} 1 & 0 & 0 & 0 & 0 & 0 & 0 & 0 \\ 1 & 1 & 0 & 0 & 0 & 0 & 0 & 0 \\ 1 & 1 & 1 & 0 & 0 & 0 & 0 & 0 \\ 1 & 1 & 1 & 1 & 0 & 0 & 0 & 0 \\ \vdots & \vdots & \vdots & \vdots & \vdots & \vdots & \vdots & \vdots \\ \vdots & \vdots & \vdots & \vdots & \vdots & \vdots & \vdots & \vdots \\ 1 & 1 & 1 & 1 & 1 & 1 & 1 & 0 \\ 1 & 1 & 1 & 1 & 1 & 1 & 1 & 1 \end{bmatrix} \times \begin{bmatrix} q_1 \\ q_2 \\ q_3 \\ q_4 \\ \vdots \\ \vdots \\ q_{N-1} \\ q_N \end{bmatrix} \quad (3)$$

The constraint that no delays should occur at critical modules is now applied to Equation (3). For example if module #3 and #4 are critical, Equation (3) should be modified to the linear equations as shown below.

$$\begin{bmatrix} \tau_1^* - \tau_1 \\ \tau_2^* - \tau_2 \\ 0 \\ 0 \\ \vdots \\ \vdots \\ \tau_{N-1^*} - \tau_{N-1} \\ \tau_N^* - \tau_N \end{bmatrix} = \begin{bmatrix} 1 & 0 & 0 & 0 & 0 & 0 & 0 & 0 \\ 1 & 1 & 0 & 0 & 0 & 0 & 0 & 0 \\ 0 & 0 & 1 & 0 & 0 & 0 & 0 & 0 \\ 0 & 0 & 0 & 1 & 0 & 0 & 0 & 0 \\ \vdots & \vdots & 0 & 0 & \vdots & \vdots & \vdots & \vdots \\ \vdots & \vdots & 0 & 0 & \vdots & \vdots & \vdots & \vdots \\ 1 & 1 & 0 & 0 & 1 & 1 & 1 & 0 \\ 1 & 1 & 0 & 0 & 1 & 1 & 1 & 1 \end{bmatrix} \times \begin{bmatrix} q_1 \\ q_2 \\ q_3 \\ q_4 \\ \vdots \\ \vdots \\ q_{N-1} \\ q_N \end{bmatrix} \quad (4)$$

In Equation (4) above, the timings $\tau_i$ as prescribed by the original recipe are known. The target timings $\tau_i^*$ are set to values which eliminate conflicts between all modules using the same robot, as described earlier. Thus LHS of Equation (4) are known values. The vector $q_i$ is then solved for by pre-multiplying $(\tau_i^* - \tau_i)$ with the inverse of the modified constraint matrix as shown in Equation (5) below. Adding this set of $q_i$ to the corresponding module process time $p_i$ will synchronize wafer transport with wafer process.

$$\begin{bmatrix} q_1 \\ q_2 \\ q_3 \\ q_4 \\ \vdots \\ \vdots \\ q_{N-1} \\ q_N \end{bmatrix} = \begin{bmatrix} 1 & 0 & 0 & 0 & 0 & 0 & 0 & 0 \\ 1 & 1 & 0 & 0 & 0 & 0 & 0 & 0 \\ 0 & 0 & 1 & 0 & 0 & 0 & 0 & 0 \\ 0 & 0 & 0 & 1 & 0 & 0 & 0 & 0 \\ \vdots & \vdots & 0 & 0 & \vdots & \vdots & \vdots & \vdots \\ \vdots & \vdots & 0 & 0 & \vdots & \vdots & \vdots & \vdots \\ 1 & 1 & 0 & 0 & 1 & 1 & 1 & 0 \\ 1 & 1 & 0 & 0 & 1 & 1 & 1 & 1 \end{bmatrix}^{-1} \times \begin{bmatrix} \tau_1^* - \tau_1 \\ \tau_2^* - \tau_2 \\ 0 \\ 0 \\ \vdots \\ \vdots \\ \tau_{N-1^*} - \tau_{N-1} \\ \tau_N^* - \tau_N \end{bmatrix} \quad (5)$$

An Application of the Synchronous Algorithm

Specific embodiments of the invention will now be further described by the following, non-limiting example which will serve to illustrate in some detail various features of significance. The example is intended merely to facilitate an understanding of ways in which the invention may be practiced and to further enable those of skill in the art to practice the invention. Accordingly, the example should not be construed as limiting the scope of the invention.

Figure 4:
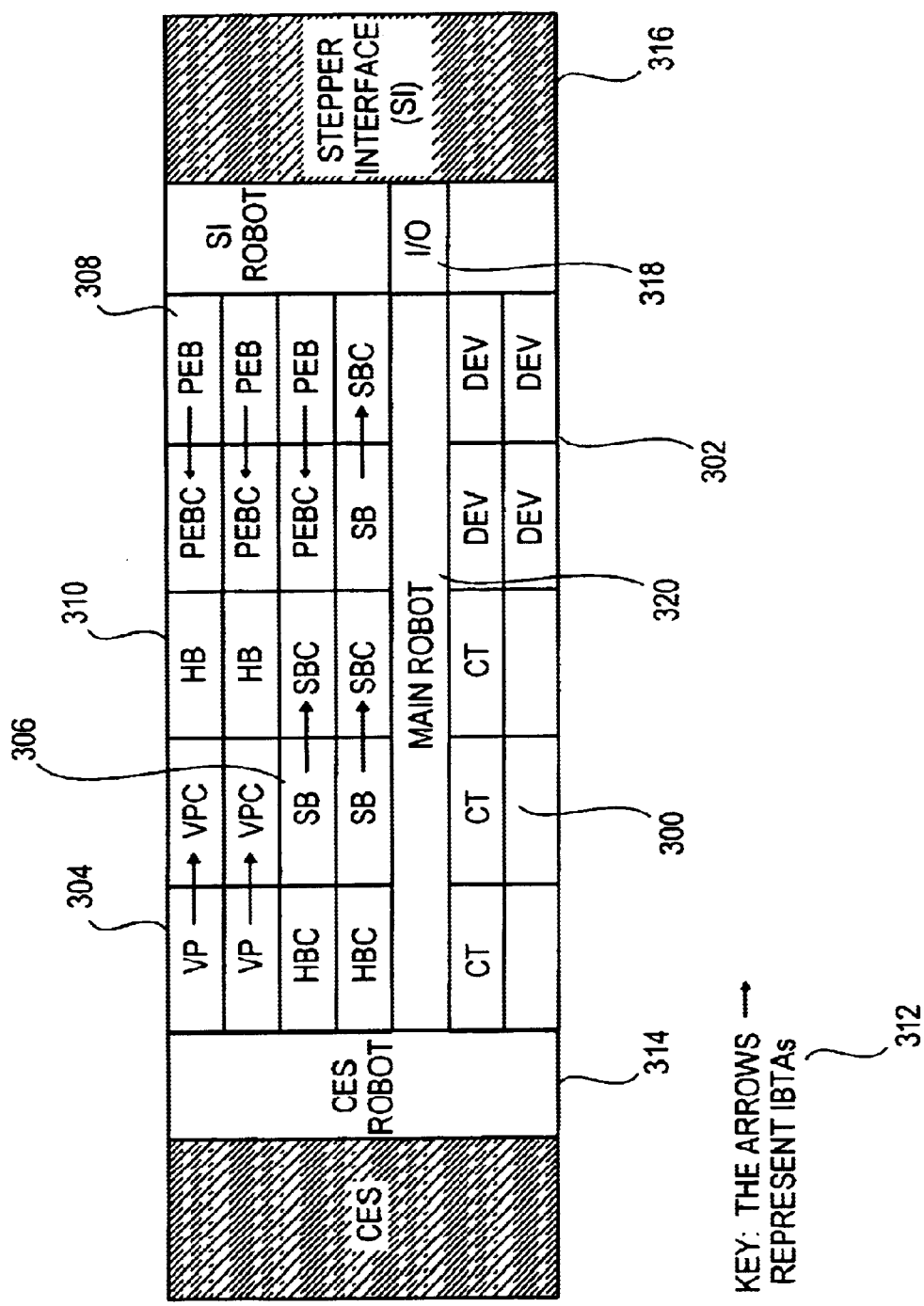
FIG. 4 illustrates the various modules and transportation modules in the cluster tool.

The synchronization of wafer transport with wafer process in a cluster tool will now be illustrated using a specific example of a cluster tool. FIG. 4 is a schematic for a conceptual plan view of a wafer processing apparatus. The resist coating and developing modules are identified as CT 300 and DEV 302 respectively. Also shown in FIG. 4 are the different bake modules vapor prime (VP) 304, soft bake (SB) 306, post exposure bake (PEB) 308, and hard bake (HB) 310, as well as their corresponding chill modules. The arrows connecting adjacent bake and chill modules represent the inter bay transfer arms, IBTAs 312, that transfer the substrate between these modules. As a result, the locations of these bake modules constrain the location of their corresponding chill plate. The main robot 320 is the means to transport the substrate between modules within the wafer track such as vapor prime chill (VPC) and resist coat (CT) modules. The cassette end station (CES) robot 314 shown in the figure transfers substrates from and to the cassette end station. Meanwhile, the stepper interface (SI) robot 316 may transfer substrates from and to the stepper interface. The I/O module 318 is a buffer zone for the substrate transported to the stepper interface if and when it becomes necessary to transport wafers to adjoining stepper apparatus to carry out lithographic processes. The synchronization and optimization provided by the invention can be appreciated within a wafer track/stepper (lithography tool) cluster.

Figure 5:
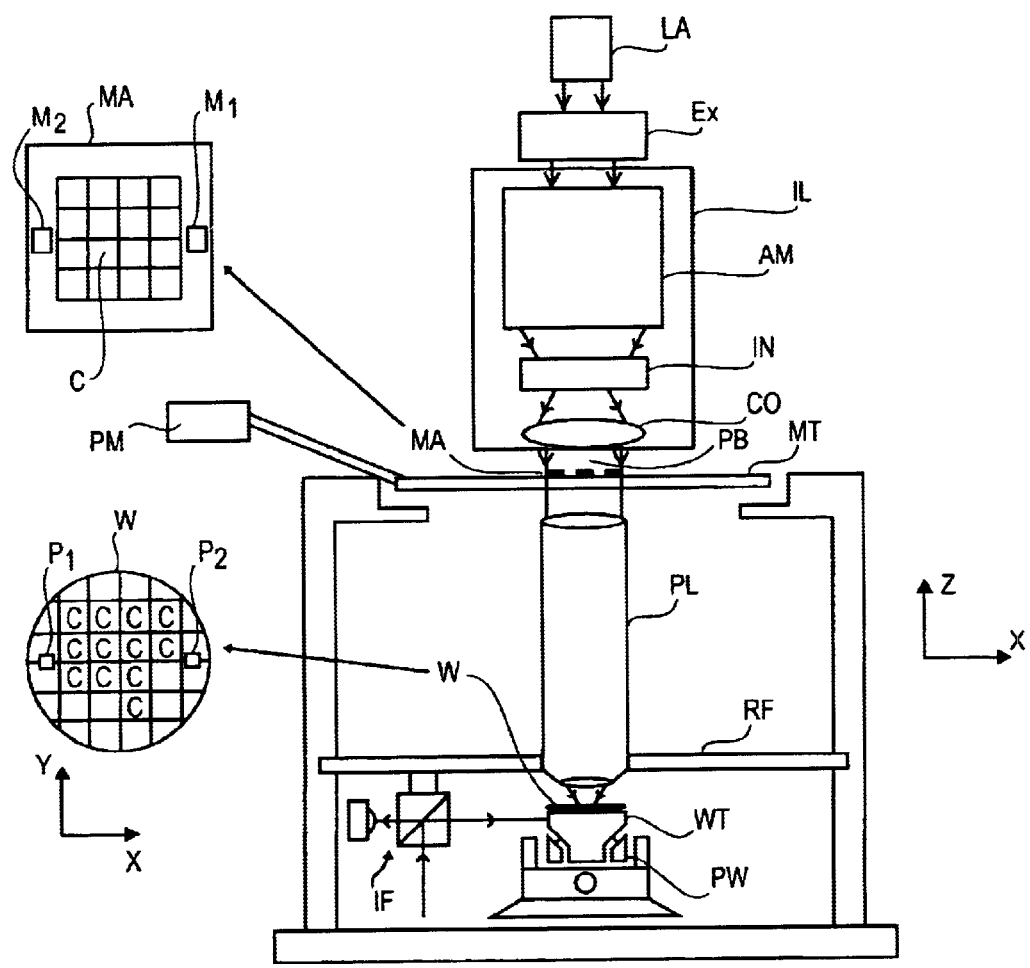
FIG. 5 is a schematic illustration of a lithographic projection apparatus.

FIG. 5 schematically depicts a lithographic projection apparatus which may be clustered with a wafer track in accordance with another aspect of the invention. The apparatus includes a radiation system Ex, IL that supplies a projection beam PB of radiation (e.g. UV or EUV radiation, such as for example, generated by an excimer laser operating at a wavelength of 248 nm, 193 nm or 157 nm, or by a laser-fired plasma source operating at 13.6 nm). In this embodiment, the radiation system also comprises a radiation source LA. The apparatus also includes a first object table (mask table) MT provided with a mask holder for holding a mask MA (e.g. a reticle), and is connected to a first positioning device PM for accurately positioning the mask with respect to item PL; a second object table (substrate table) WT provided with a substrate holder for holding a substrate W (e.g. a resist-coated silicon wafer), and is connected to a second positioning device PW for accurately positioning the substrate with respect to item PL. The projection system or lens PL (e.g. a quartz and/or CaF2 lens system or a refractive or catadioptric system, a mirror group or an array of field deflectors) is constructed and arranged to image an irradiated portion of the mask MA onto a target portion C (e.g. comprising one or more dies) of the substrate W. The projection system PL is supported on a reference frame RF. As here depicted, the apparatus is of a transmissive type (i.e. has a transmissive mask). However, in general, it may also be of a reflective type, for example with a reflective mask. Alternatively, the apparatus may employ another kind of patterning structure, such as a programmable mirror array of a type as referred to above.

The source LA (e.g. a mercury lamp, an excimer laser, an electron gun, a laser-produced plasma source or discharge plasma source, or an undulator provided around the path of an electron beam in a storage ring or synchrotron) produces a beam PB of radiation. This beam PB is fed into an illumination system (illuminator) IL, either directly or after having traversed a conditioner, such as a beam expander Ex, for example. The illuminator IL may comprise an adjusting structure or field AM for setting the outer and/or inner radial extent (commonly referred to as .sigma.-outer and sigma.-inner, respectively) of the intensity distribution in the beam, which may affect the angular distribution of the radiation energy delivered by the projection beam at, for example, the substrate. In addition, the apparatus will generally comprise various other components, such as an integrator IN and a condenser CO. In this way, the beam PB impinging on the mask MA has a desired uniformity and intensity distribution in its cross-section.

It should be noted with regard to FIG. 5 that the source LA may be within the housing of the lithographic projection apparatus (as is often the case when the source LA is a mercury lamp, for example), but that it may also be remote from the lithographic projection apparatus, the radiation beam which it produces being led into the apparatus (e.g. with the aid of suitable direction mirrors); this latter scenario is often the case when the source LA is an excimer laser. The current invention and claims encompass both of these scenarios.

The beam PB subsequently intercepts the mask MA, which is held on a mask table MT. Having traversed (alternatively, having been selectively reflected by) the mask MA, the beam PB passes through the lens PL, which focuses the beam PB onto a target portion C of the substrate W. With the aid of the second positioning structure PW (and interferometric measuring structure IF), the substrate table WT can be moved accurately, e.g. so as to position different target portions C in the path of the beam PB. Similarly, the first positioning structure can be used to accurately position the mask MA with respect to the path of the beam PB, e.g. after mechanical retrieval of the mask MA from a mask library, or during a scan. In general, movement of the object tables MT, WT will be realized with the aid of a long-stroke module (coarse positioning) and a short-stroke module (fine positioning), which are not explicitly depicted in FIG. 5. However, in the case of a wafer stepper (as opposed to a step-and-scan apparatus) the mask table MT may just be connected to a short stroke actuator, or may be fixed. Mask MA and substrate W may be aligned using mask alignment marks M1, M2 and substrate alignment marks P1, P2.

The depicted apparatus can be used in two different modes:

1. In step mode, the mask table MT is kept essentially stationary, and an entire mask image is projected at once (i.e. in a single "flash") onto a target portion C. The substrate table WT is then shifted in the x and/or y directions so that a different target portion C can be irradiated by the beam PB.
2. In scan mode, essentially the same scenario applies, except that a given target portion C is not exposed in a single "flash". Instead, the mask table MT is movable in a given direction (the so-called "scan direction", e.g. the y direction) with a speed v, so that the projection beam PB is caused to scan over a mask image. Concurrently, the substrate table WT is simultaneously moved in the same or opposite direction at a speed V=Mv, in, which M is the magnification of the lens PL (typically, M=¼ or ⅕). In this manner, a relatively large target portion C can be exposed, without having to compromise on resolution.

Figure 6:
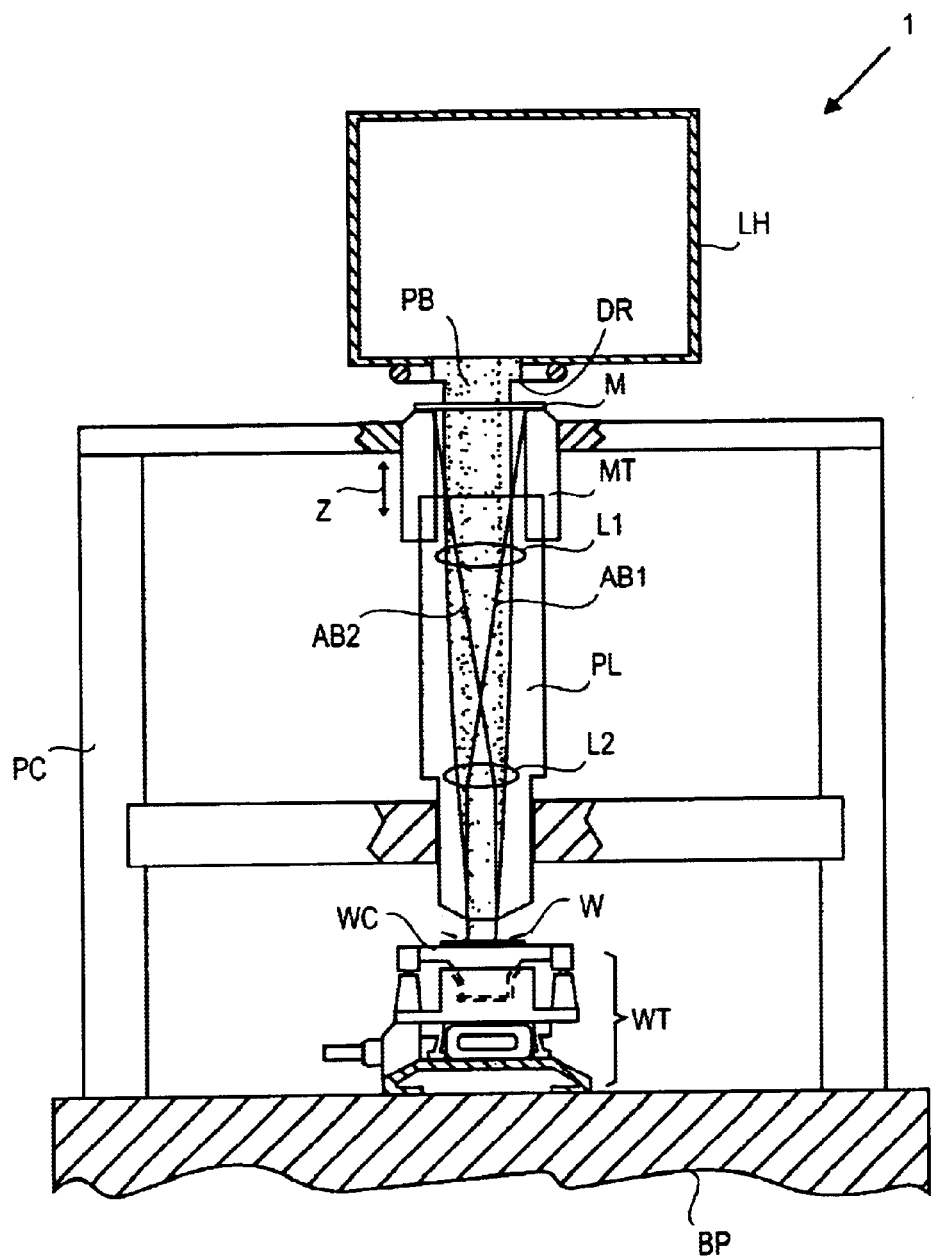
FIG. 6 is a schematic illustration of an apparatus constructed and arranged to image a mask on a substrate.

With reference to FIG. 6, an illumination system IL as described above can be used to repetitively image the mask M on the substrate W. The lithographic apparatus shown is transmissive; however, it may also be reflective or catadioptric, for example. The lithographic apparatus 1 includes an illumination housing LH containing a radiation source and an illumination system according to the present invention constructed and arranged to supply the projection beam PB. The projection beam PB passes through a diaphragm DR and is subsequently incident on the mask M which is arranged on the mask table MT, which is adjustable in position. The mask table MT forms part of a projection column PC incorporating the projection system or lens PL which includes a plurality of lens elements L1 and L2 as shown or more. The projection system or lens PL images the mask M onto the substrate W which is provided with a photoresist layer. The substrate W is provided on a substrate support WC which forms part of the substrate table WT on, for example, air bearings. The projection system or lens PL has, for example a magnification M=⅕, a numerical aperture NA>0.48 and a diffraction-limited image field with a diameter of, for example 22 mm. The substrate table WT is supported, for example by a granite base plate BP which closes the projection column PC at its lower side.

The substrate can be displaced in the X, Y and Z directions and rotated, for example about the Z axis with the aid of the substrate table WT. These adjustments are controlled by various servo-systems such as a focus servo-system; for example an X; Y, Φz interferometer system cooperating with the substrate support, and an alignment system with which mask marks can be aligned with respect to substrate marks. These servo-systems are not shown in FIG. 6. Only the alignment beams AB1, AB2 of the alignment system are shown.

The mask MA must be imaged a number of times, in accordance with the number of ICs to be formed on the substrate W, each time on a different target area C of the substrate W.

FIG. 7 is a schematic for the wafer process flow. As can be seen from the schematic, when the transport means is the IBTA the substrate will have only one option in the flow diagram. This is the case when the substrate is transported from a vapor prime bake 400 to vapor prime chill 402. However, when the transport means is the main robot the substrate could have several options. For example, when a substrate is removed from a resist coat module 404, it can be transported to any of the soft bake modules 406 shown in FIG. 7.

The Synchronization Algorithm

We will now demonstrate the application of the synchronization algorithm to this cluster tool as a series of four steps:

Step 1: Input The Recipe And Throughput Requirement. This discussion refers to FIGS. 8A–B. This step commences by inserting the recipe in a table 500. The first two columns 502 list the process steps in sequential order. The sending period, also referred to as the "system takt time" is also noted 504. Cycle times, also known as module takt times, are then calculated for each module in the "Module type" column 502 to ensure each module takt time is less than the system takt time. The module takt time for each process step is listed in a column 506. If not, redundant modules are added to reduce module takt time. As will be clear to one skilled in the art, for each process step:

No. Modules Required=INT(Module takt time/System takt time)

In this example, most modules require one additional redundant module. The number of modules required for each process step is listed in a column 508.

Step 2: Determine The Load of The Wafer Transport. As defined earlier, the "load" of a robot refers to the number of moves it is scheduled make as well as the times allotted for the robot to perform these moves, as measured from the beginning of the current sending period. The determination of the robot load is depicted in the table 600 in FIGS. 9A–B. This cluster apparatus of this example has twelve process steps. The timings of the twelve corresponding robot moves are determined as follows. Counting the time from the moment the wafer leaves the load port (cassette), cumulate the process times of each module and transport times up to the module of interest. For example, for the module codenamed VP 602 (hereafter all modules are coded), it is (62+6)=68 sec; for module VPC 604, it is (68+65+5)=138 sec. The actual timings in seconds for all robot moves are listed in a column marked "Actual" 606. To determine the relative pick-up times $T_i$, the actual times are divided by the actual sending period. For example, dividing the actual pick-up times of VP and VPC by the actual sending period of 45 sec results, respectively, in normalized pick-up times 1.511 and 3.067. The normalized pick-up times for each of the twelve process steps are listed under the column "$T_i$ Normalized" 608.

Figure 9B:
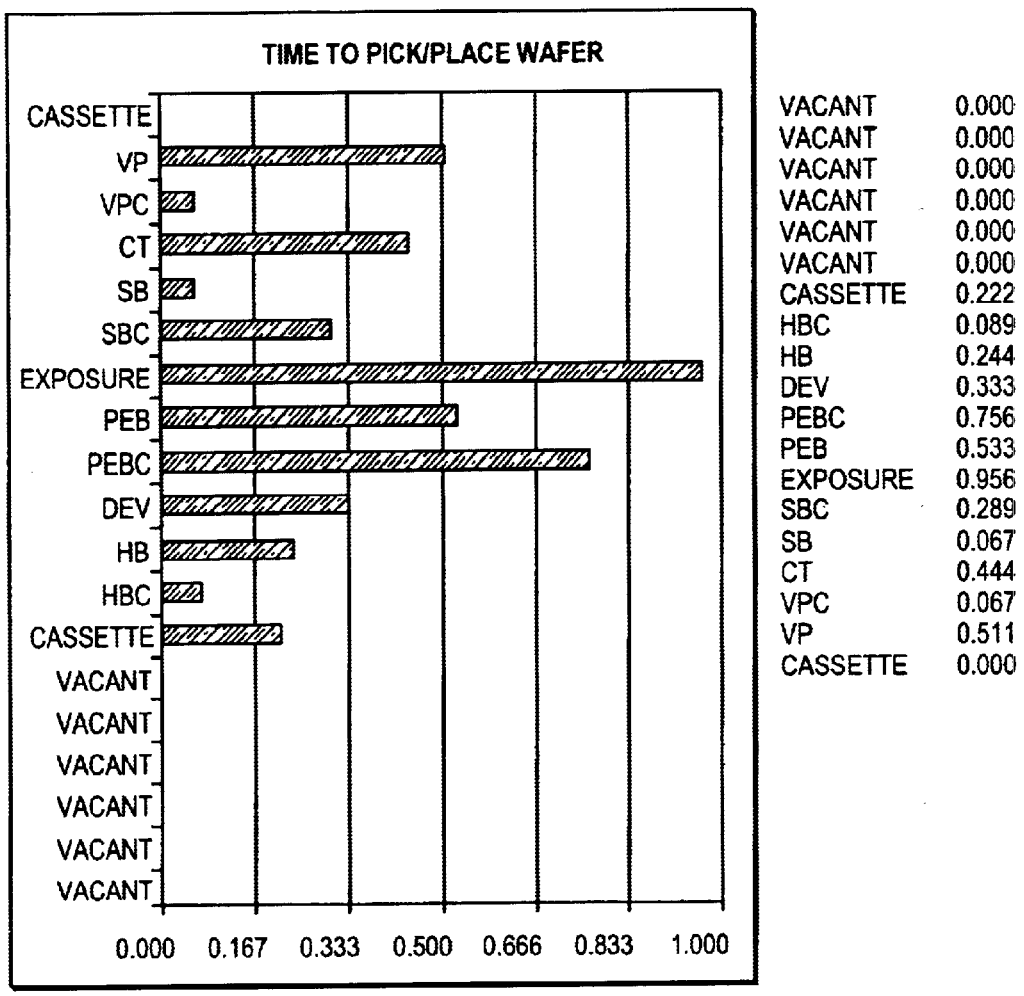
Figure 10:
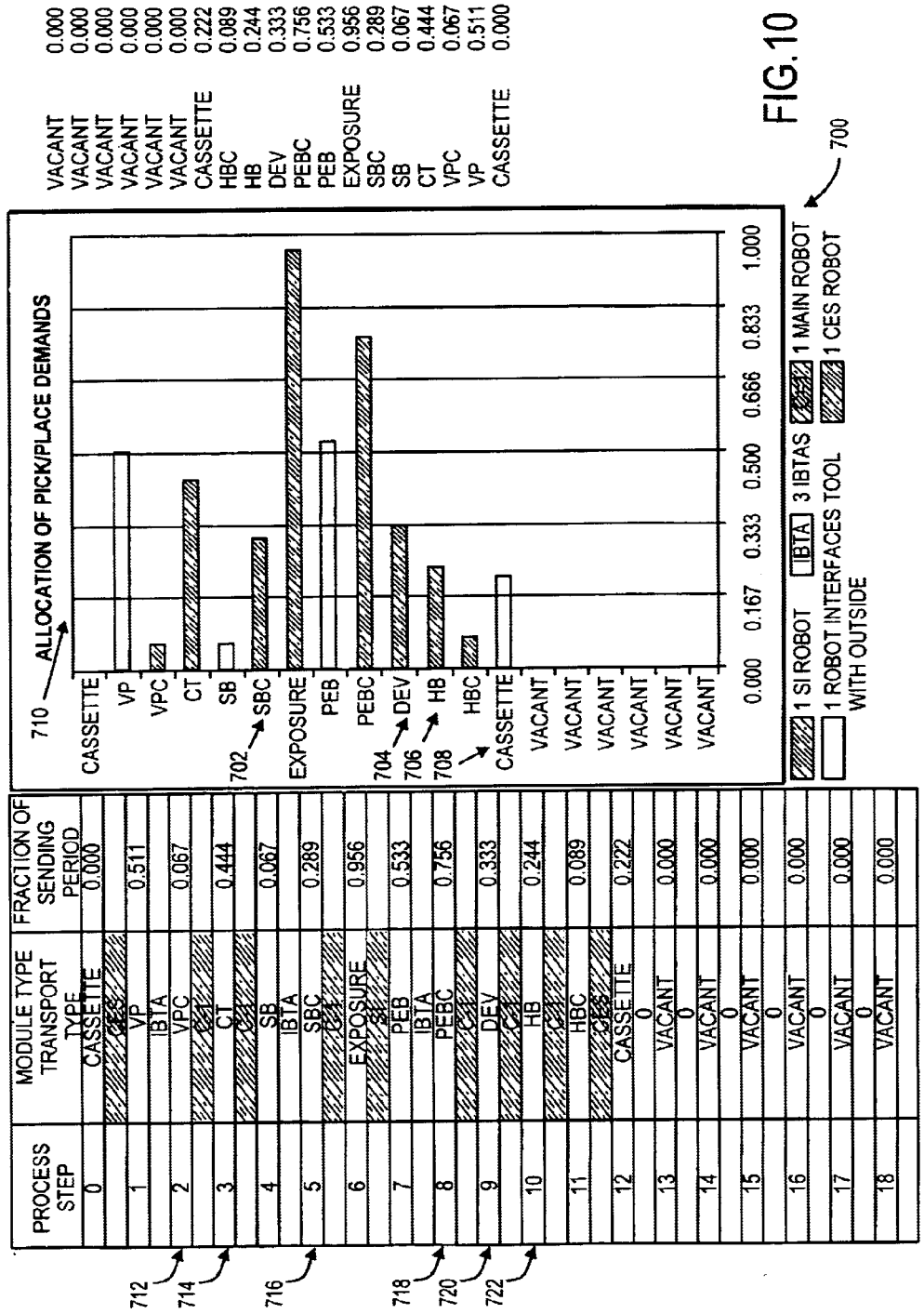
FIG. 10 is a graph and corresponding table illustrating conflicts that arise between processes for access to robots, wherein conflicts are indicated when two modules assigned to a robot have pick-up demands within a single period.

Subtracting the integer portion of the $T_i$ values results in the $\tau_i$ values, i.e., the time the available time the respective modules have to be served by robots, as measured from the beginning of sending period, and expressed in units of one sending period. To illustrate, the $\tau_i$ values of VP and VPC are 0.511 and 0.067, which indicates that VP must be serviced within 0.511 intervals of one sending period, and VPC must be serviced within 0.067 intervals of one sending period. The list of normalized $\tau_i$ values are listed in a column 610. The diagram 612 as shown in FIG. 9B is a pictorial representation of the load: a total of twelve moves and the time they have to be served within a sending period. FIG. 10 shows the same information from another perspective. Since the robot transport times are around 5 & 6 seconds, the number of move one robot can make within a sending period of 45 sec is (45/6)~7; say 6 moves to be on the conservative side. Thus 6 vertical lines are drawn in the graph 700. When the times the modules have to be served by a robot fall within one interval, such as SBC 702, DEV 704, HB 706, and Cassette 708, all of which fall into one interval 710, it means that they are competing for the same move of the robot at a given time. To elaborate, if there are two or more tasks which use one robot, and if the T values of these tasks fall into one of the 6 intervals, it means that there is insufficient time for the robot to service each of the two or more robots.

These "conflicts" between the tasks for use of the robots are resolved as described in the subsequent steps.

Step 3: Allocate The Transport Load. The first step to resolve conflicts in the manufacturing system is to allocate the load equally among robots in order to achieve a balanced transport load. Although conflicts are recipe dependent, assigning fewer loads per robot still reduces the chance for conflict. However, the possibility of balancing the load is dependent on the layout of the modules relative to robots. Poor layout limits accessibility to modules by robots and makes balanced loads difficult to attain. In this example, the layout is such that two robots, CES and SI, can each only serve two modules, leaving the bulk of the load to the main robot C-1 and three dedicated robots known as IBTA (Inter Bay Transfer Arm). The best allocation of transport load, under the constraints of the layout, is as shown in FIG. 10. Six modules, VPC 712, CT 714, SBC 716, PEBC 718, DEV 720, and HB 722 are allocated to the main robot C-1 with three of them, SBC, DEV and HB competing for one move of the robot, as discussed earlier. These conflicts will be resolved by queuing as demonstrated in the next step.

Figure 11B:
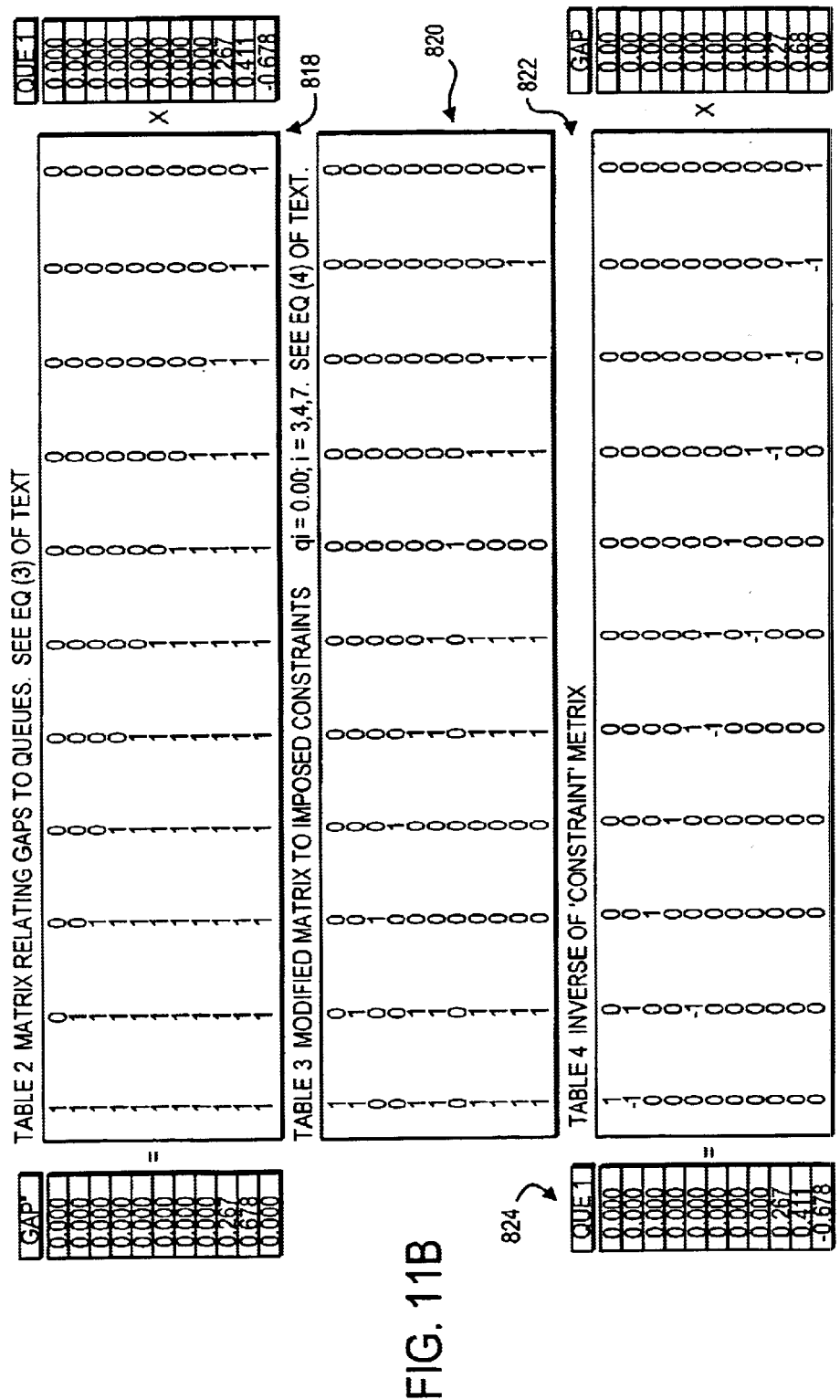

Step 4: Queuing For Synchronization. The information in the table 800 of FIGS. 11A–B is a summary of load allocation from Step 3. Only the six modules served by main robot C-1, i.e., VPC 802, CT 804, SBC 806, PEBC 808, DEV 810, and HB 812, need to be considered for queuing. The remaining modules should not experience conflicts since each has dedicated robot, i.e., an IBTA, serving them. In the Target Column 814, the target timing profile is set for the 6 modules. For each of the modules listed in the table, a corresponding value is set for $\tau^*$, where $\tau^*$ is an updated value for $\tau$ which eliminates conflicts between tasks for robots. Since only 3 of these 6 modules, SBC 806, DEV 810, and HB 812 are in conflict, only two, DEV and HB, need to have timing targets different from the original values for T prescribed by the recipe. The timing targets are listed in a column 814, and are set such that the timing interval between any pair of the 6 modules is larger than robot transport time (=6/45~0.1333). The differences between the target and the originally prescribed timing profiles are referred to as the gaps and are computed the column 816. These are shown pictorially in the graph 818 adjacent to the table. Another objective of the "synchronous algorithm" is to ensure that no delays are introduced at critical process steps. In this example, critical process steps are step 3 804, step 4 806, and step 7 809. No queues should be added to modules corresponding to these steps, i.e., the target timing for these modules should be the same as the prescribed values. The gaps computed in the Gap column 816 may now be substituted in to Equation (3) to solve for the queues that will close these gaps. However, to ensure zero delays at the critical process modules, the matrix 818 relating gaps and queues must be modified per Equation (4) to generate a modified matrix 820. Pre-multiplying the gaps from the Gap column 816 with the inverse of the modified matrix 822 produces the queues needed to close the gap 824. The solution for the queues is transferred to a Que Column 826. The solution, which is in units of the sending period, is converted to actual time in an Actual Que Column 828.

Step 5: Check The Solution. The queues determined in Step 4 are now added to the module processing time of the original recipe. This is to verify if conflicts have been resolved. This is in fact the case as shown in the figure.

Robot Assignment

Another aspect of the scheduling problem, which merits automation, is the assignment of robots to modules. For example, in step three listed above, a recipe was chosen which assigned a single robot between each pair of consecutive models; this allocation is shown in the recipe listed in FIG. 10. The allocation was chosen amongst many possible allocations.

In general, there is a need for an algorithm that determines an optimal robot assignment prior to the determination of queues. The need for such an algorithm will be demonstrated in the following example. Suppose we have a simplified track system, consisting of three modules, labeled Mod1, Mod2 and Mod3. Suppose we have two robots, Robot1 and Robot2, both of which can service all three modules. Let the sending period be designated by the variable SP. Suppose $\tau_1=00$, $\tau_2=0.6$, $\tau_3=0.7$, in units of the sending period, and suppose the robots can move in 0.3, in units of SP. There are four possible robot allocations:

| Assignment | Mod1 to Mod 2 | Mod2 to Mod3 |
|---|---|---|
| 1. | Robot1 | Robot1 |
| 2. | Robot2 | Robot2 |
| 3. | Robot1 | Robot2 |
| 4. | Robot2 | Robot1 |

Upon inspection, only assignments 3 and 4 are viable. In assignments 1 and 2, the time interval between $\tau_2=0.6$ and $\tau_3=0.7$ is 0.1 sending periods, which is less than the 0.3 sending periods required for a robot to move. Hence the optimal allocations are, in this case, assignment #3 and #4; as the time intervals between the $\tau$ values have sufficient distance, this robot assignment obviates the need to insert delays. Other criteria may also enter into the determination of an optimal robot assignment, for instance, balancing loads, increasing throughput. An algorithm is necessary which would determine, in cases more complicated than the simplified example above, an optimal robot assignment.

One method of performing such an assignment is simply an exhaustive technique: generate all possible robot assignments, and determine the validity of each assignment, i.e., ensure that all modules assigned to a robot differ sufficiently in their $\tau$ values to permit the robot to service them. The assignments thus generated may also be selected on additional criteria, such as load balancing.

Solving for Updated Timings ($\tau^*$)

Another feature of the synchronization that merits automation is the derivation of the updated timings, given by $\tau^*$. To elaborate, in step 4 of the algorithm outlined earlier, the algorithm was fed updated values of $\tau^*$, where for any two modules which shared a robot, the respective $\tau^*$ values differed by enough time to allow the robot to move between them. There is a need for an automated method of deriving these $\tau^*$ values. One such technique is as follows:

For each robot with a conflict, take the $\tau$ value for each of its modules.

For each combination of these $\tau$ values, sort the $\tau$ values from lowest to highest.

For each sorted list of $\tau$ values:

Proceed sequentially through the $\tau$ values, from lowest to highest.

Determine the difference between the given $\tau$ value and the one that precedes it If the difference is less than the time allotted for the robot to move, increment the $\tau$ value sufficiently.

Go to next $\tau$ value.

When this algorithm finds an updated set of $\tau$ values for a given robot that eliminates conflicts, these become $\tau^*$ values. It can be proven that if a conflict-free group of $\tau^*$ values exist, the algorithm outlined above will find it.

Genetic Algorithms

The synchronization, robot assignment, and derivation problems can also be solved by use of a genetic algorithm (GA). A GA is an iterative process that starts out with an initial population of genes, which encode possible states of the problem. This population is systematically improved with each iteration, through a process of selective breeding. To perform selective breeding, the GA needs to a) define the characteristics of a species, and b) judge a species' fitness.

Characteristics Of A Species

A specie is characterized by n genes. For our problem, we use two types of genes, one to represent the robot assignment, and the other, a queue segment. Consider the example used in the description of the earlier algorithm. The robot assignment will range from 1 to 4, indicating which robot will work on a particular module. Queue segment is also an integer indicating how many "time zones", i.e., robot move periods, are to be added to a module's arrival time in order to avoid conflict in robot assignment. In our earlier example, the modules arrive in six different time zones 612 as shown in FIG. 9B. If a time zone sees the arrival of, for instance, five modules, a conflict results. The addition of a queue segment to one of the modules will push the arrival time to the next time zone and hence resolve the conflict.

Fitness of a Species

We can measure fitness by the reciprocal of a species' 'badness'. In turn, badness can be measured by a weighted sum of the degree of conflict and the number of added queue segments. An ideal species is one that has no added segments, and results in no conflict in robot assignment.

To derive the fitness function, we scan each time zone and count the number of redundant assignments for each robot. The results are summed for all robots and all time zones.

Call this sum s. We proceed to count the number of added queue segments, and call it t. The fitness function is then $$f(s, t) = \frac{1}{(1 + w_1 s + w_2 t)};$$

where the weights $w_1$ and $w_2$ are assigned according to the relative importance of s over t.

The foregoing description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

What is claimed is:

1. A method of optimizing throughput and performance in a wafer processing system comprising the following steps:

selecting a wafer track and lithographic projection apparatus cluster that includes a plurality of transportation resources for transporting semiconductor wafers between: a wafer track portion a lithographic projection portion within the cluster; and a plurality of modules within the wafer track portion for processing the semiconductor wafers in a predetermined sequence;

fixing a constant sending period for sequentially dispatching the semiconductor wafers into the wafer track, the sending period remaining fixed throughout the sequence of semiconductor wafers;

expressing times for pickup of a semiconductor wafer from an ith module, ($\tau$i), in units of the sending period;

expressing a plurality of times ($\tau$i) allotted for a wafer transporter to arrive at a module from initiation of a current sending period for transportation of the semiconductor wafer from a module i to a module i+1 as a portion of the sending period; and selectively incrementing at least one in the plurality of times ($\tau$i) to arrive at a solution of times ($\tau$i) that remains fixed at constant values throughout the sequence of the semiconductor wafers, the solution of times ($\tau$i) assuring availability of the plurality of transportation resources.

2. The method of claim 1, wherein the plurality of modified times ($\tau$i) are updated to accommodate changes in wafer processing system parameters.

3. The method of claim 1, wherein the plurality of modified times ($\tau$i) are updated in real-time.

4. An apparatus for scheduling allocation of a plurality of transportation resources between modules within a wafer track/stepper cluster for a sequential wafer manufacturing process comprising:

a memory resource for storing an algorithm for scheduling the plurality of transportation resources for movement of wafers within the wafer track and between the wafer track and stepper;

a central processing unit coupled to the memory resource; and an input/output interface coupled to at least one of the central processing unit and the memory resource, the input/output interface adapted, respectively, to input parameters describing the sequential wafer manufacturing process and to output schedules for allocation of transportation resources to transport wafers within the wafer track and between the wafer track and stepper, the output schedules assuring availability of transportation resources and determined such that a sending period and a plurality of times ($\tau_i$) allotted for a wafer transporter to arrive at a module from initiation of a current sending period for transportation of a wafer from a module i to a module i+1 for the sequential wafer manufacturing process remain fixed at constant values throughout a sequence of wafers.

5. The apparatus of claim 4, wherein the memory resource and the central processing unit are external to the transportation resources.

6. The apparatus of claim 4, wherein the algorithm identifies at least one critical module that should not incur delays and exempts the at least one module from the addition of delays.

7. The apparatus of claim 6, wherein the algorithm employs a linear transformation to determine the appropriate delays to eliminate conflicts for the plurality of transportation resources.

8. A method for synchronizing a wafer processing system comprising the following steps:

selecting a wafer processing system that includes a clustered wafer track system and lithography apparatus with one or more ordered sequence of modules;

setting a constant sending period of the sequential processing system that remains fixed throughout a sequence of wafers, the constant sending period equaling an inverse of a sending rate; and expressing a plurality of times allotted for a plurality of wafer transporters to arrive at corresponding modules of the one or more ordered sequence of modules as a plurality of portions of the sending period, each and every time allotted for the plurality of wafer transporters remaining fixed at a constant value throughout a sequence of wafers.

* * * * *